June 29, 1965  L. D. VAGI  3,191,219

SEPARABLE HINGE WITH STOP MEANS

Original Filed April 27, 1960

INVENTOR.
Louis D. Vagi
BY
WILSON, SETTLE & CRAIG
ATTORNEYS

United States Patent Office 3,191,219
Patented June 29, 1965

3,191,219
SEPARABLE HINGE WITH STOP MEANS
Louis D. Vagi, 420 Sunningdale Drive, Inkster, Mich.
Original application Apr. 27, 1960, Ser. No. 25,146, now Patent No. 3,034,758. Divided and this application Oct. 16, 1961, Ser. No. 145,355
1 Claim. (Cl. 16—171)

This invention relates to a connector mechanism, and more particularly to a connector mechanism adapted to join a first element having a generally cylindrical exterior surface with a second element having a generally cylindrical interior surface, and to a hinge structure embodying the above concept.

This application is a division of my co-pending application Serial Number 25,146 filed April 27, 1960, now Patent No. 3,034,758.

Numerous arrangements have been proposed in the past for connecting tubular items to each other, such as curtain rods, vacuum cleaner wands, guide rails, porch rails, display rack elements, and other items. However, in general, the prior art structures have been characterized by a substantial amount of complexity, rendering them expensive to manufacture. Such devices heretofore proposed have provided a substantial amount of utility and service, yet for many installations the prior devices have been too expensive and complex for widest application. Thus, the lack of simplicity and economy of installation and removal, the lack of positive locking of the inter-connected elements, and the lack of compatibility with a wide range of materials and applications has substantially limited the application of the prior art devices.

Therefore, if a connector mechanism adapted to connect a first element having an outer cylindrical surface with a second element having a generally cylindrical inner surface could be provided of extremely simplified and economical manufacture, many attachment problems now considered infeasible would be solved, and a definite step forward in the art of joining items of generally tubular configuration would be provided.

It is, therefore, an important object of the present invention to provide a connector mechanism having novel features and simplicity of construction, positive locking and ease of assembly and disassembly.

A further object of the invention is to provide a more effective as well as novel connector mechanism which has applicability in a greater diversity of applications.

A further object of the invention is to provide a connector mechanism which can be incorporated with a wide variety of materials, such as aluminum, plastics and steel.

A more particular object is to provide a connector mechanism for telescoping elements wherein the inner element has a generally cylindrical outer surface and wherein the outer element has a generally cylindrical inner surface, adapted to coact with each other.

A still more particular object of the invention is to provide a connector mechanism for joining telescoping tubular members wherein coacting elements are provided on each of the members for interlocking to provide quick assembly and disassembly in a novel manner.

A still further object is to provide a novel hinge element utilizing a first body having a generally cylindrical outer surface and a second body having a generally cylindrical inner surface for mutual cooperation and incorporating an interlock for restraining the hinge at a selected portion of its movement.

A further object of the invention is to provide a more broadly usable connector mechanism having an internal connection with the outer device to be connected therewith, such that extensive external surfaces of the outer device are relatively freed of obstructions. This characteristic is of particular advantage in such installations as the formation of guide rails, the connection of tubular members to one another, and the like, and in such installations a smooth, relatively obstruction-free surface is essential to proper guiding and traversing of the cooperating components.

Other objects of this invention will appear in the following description and appended claims, reference being had to the accompanying drawings forming a part of this specification wherein like reference characters designate corresponding parts in the several views.

Before explaining the present invention in detail it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
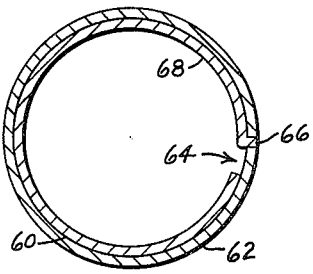
FIGURE 1 is a sectional view through one embodiment of the present invention, showing the invention as applied to the interlocked connection of two telescoped tubes or pipe members.
Figure 2:
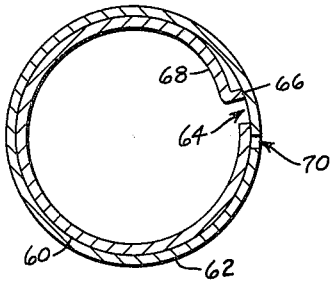
FIGURE 2 is a sectional view similar to FIGURE 1, but showing the telescoped tubes in partially assembled relation.

*The embodiment of FIGURES 1 and 2*

Referring to FIGURES 1 and 2, there is disclosed an arrangement including an inner tube 60 and an outer tube 62. The inner tube is cut through at 64, and the portion thereof adjacent the cut is turned outwardly to form the detent 66. Additionally, the detent 66 extends out at a right angle to cut 64 so that the portion 68 of the tube functions as a spring arm, as is more apparent from FIGURE 2.

The outer tube 62 is provided with a detent-reception opening 70, the arrangement being such that the inner tube may be rotated from its FIGURE 2 position in the clockwise direction so as to cause the detent 66 thereof to snap into the opening 70, as shown in FIGURE 1, by reason of the spring action of arm 68.

The FIGURE 1 construction can be utilized for detachably, lockably connecting two tubes together such as two tubular sections utilized in vacuum cleaner wands. Of course within the broader aspests of the invention tubes 60 and 62 could serve any useful purpose, as for example telescoping-cover-container assemblies, elongated conduits, display rack pipe sections, porch rail sections, or various ornamental tubular products such as tubular furniture frameworks, etc.

Figure 3:
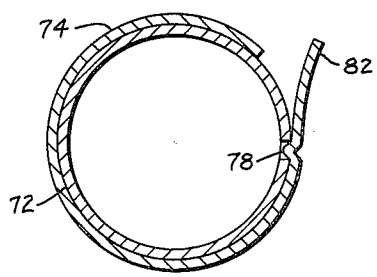
FIGURE 3 is a sectional view through a second embodiment of the invention, with the components thereof in an interlocked condition.
Figure 4:
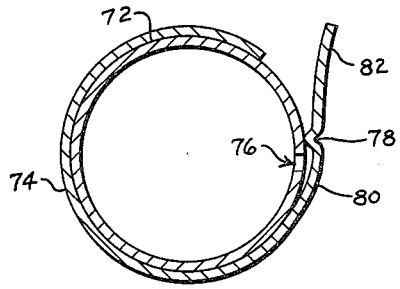
FIGURE 4 is a sectional view similar to FIGURE 3, but showing the components in partially assembled relation.

*The embodiments of FIGURES 3 and 4*

The construction shown in FIGURE 3 is similar in some respects to the FIGURE 1 construction, a point of difference however being that the detent 78 in the FIGURE 3 arrangement is carried on the female tube part 74 rather than on the male part 72.

The FIGURE 3 arrangement comprises an inner tube 72 and an outer tube 74, the inner tube having a detent-reception opening 76, and the outer tube being deformed to provide a detent 78. The portion of tube 74 adjacent detent 78 is slit to form a resilient arm section 80, and the slit is carried beyond the detent to form a finger lift portion 82. It will thus be seen that when the tubes are in the FIGURE 4 position, rotation of the inner tube 72 in a counter-clockwise direction is effective to cause the detent 78 to snap into the opening 76 for locking the tubes together as shown in FIGURE 3.

The connection between the tubes may be readily disconnected or broken by a manual pull back on the finger lift portion 82 sufficient to take the detent 78 out of opening 76.

Figure 5:
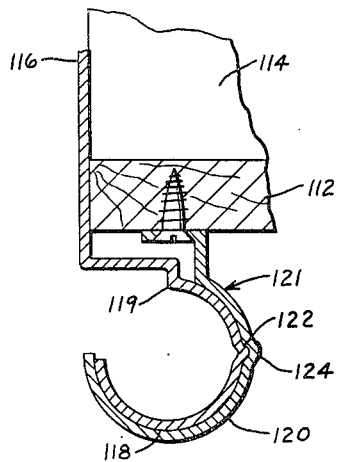
FIGURE 5 is a sectional view illustrating the invention as applied to a hinge structure.
Figure 6:
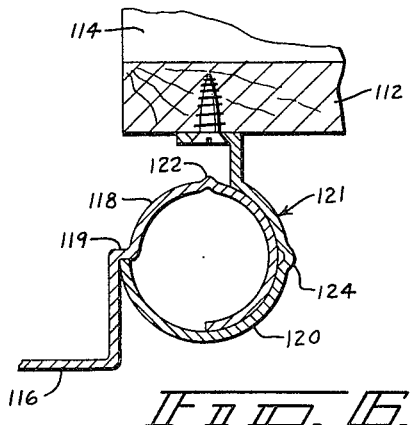
FIGURE 6 is a sectional view similar to FIGURE 5, showing the hinge element rotated through a 90° arc.

*The hinge embodiment of FIGURES 5 and 6*

FIGURES 5 and 6 illustrate the invention as applied to a hinge construction. The FIGURE 6 arrangement comprises a fixed frame, a portion of which is shown at 112. The frame defines a door opening at 114, which is adapted to be opened and closed by a door or closure 116. The closure is provided with one or more arcuate extensions 118, each of which winds within an arcuate section 120 of a hinge member 121 carried on frame 112. FIGURE 5 illustrates the door in a fully closed position, and FIGURE 6 shows the door in an open position. Movement of the door to the open position may be limited by a shoulder at 119.

Installation of the door is effected by slipping extension 118 into section 120 with the door in an open position, and then winding the extension into the FIGURE 5 condition.

In the FIGURE 6 open position a detent 122 on extension 118 seats within a recess or opening 124 in section 120, the arrangement being such as to prevent inadvertent opening of the closure but without the necessity of a separate catch-latch assembly. The detent-opening relationship may be employed to hold the door in any desired position between fully closed and fully opened by suitable placement.

The invention as applied to a hinge-type connector construction may be utilized in several fields, as for example milk boxes, clothes chutes, medicine chests, novelty boxes and automobile glove compartment doors.

In manufacture of the above-described constructions shown in FIGURES 1 through 6 various materials such as steels, aluminum and a wide variety of plastics can be utilized. Due to the design of the cooperating parts and the manner in which they cooperate it is possible to construct the parts as relatively large diameter devices or as relatively small diameter devices. As a result the invention has application in a wide variety of fields.

The above description has necessarily been restricted to a discussion of specific embodiments and applications. However, it will be appreciated that the invention can be utilized in various modified forms, and that certain changes in construction and arrangement can be resorted to without departing from the spirit of the invention as set forth in the appended claim.

I claim:

A connector comprising a first hollow tubular member of semi-cylindrical transverse cross section extending substantially 270° in its circumferential extent to define a pair of axially extending edges spaced substantially 90° from each other, a second hollow tubular member telescopically received within said first tubular member with the outer surface of said second member in face-to-face engagement with the inner surface of said first member, an outwardly projecting shoulder on said second member engageable with one of said axially extending edges to limit relative rotation of said members in one direction, one of said members having an axially extending recess therein, an integral radially projecting detent on the other of said members complementary in shape to said recess and engageable therein to define an end limit to relative rotation of said members in the opposite direction, at least one of said members being constructed of a relatively stiff but resilient material to accommodate resiliently opposed radial flexing of one of said other members to permit relative rotation of the telescoped members with said detent disengaged from said recess, said detent being operable when engaged in said recess to lock said members against rotation relative to each other.

References Cited by the Examiner

UNITED STATES PATENTS

| | | | |
|---|---|---|---|
| 1,269,764 | 6/18 | Weaver | 16—142 |
| 1,355,548 | 10/20 | Ferris | 16—95 |
| 1,553,132 | 9/25 | Bertrand | 248—251 |
| 1,661,674 | 3/28 | Osborn | 285—319 |
| 1,931,271 | 10/33 | Simmons | 16—191 |
| 2,331,595 | 10/43 | Bush | 16—140 |
| 2,658,233 | 11/53 | Kimmel | 16—172 |
| 2,852,802 | 9/58 | Seby | 16—171 |
| 3,034,758 | 5/62 | Vagi | 248—251 |

FOREIGN PATENTS 495,211   4/30   Germany.

CARL W. TOMLIN, *Primary Examiner.*

WALTER A. SCHEEL, THOMAS F. CALLAGHAN,
*Examiners.*